United States Patent
Ezumi et al.

(10) Patent No.: US 9,422,909 B2
(45) Date of Patent: Aug. 23, 2016

(54) AUTOMATIC STOP DEVICE FOR VEHICLE ENGINES

(71) Applicant: MAZDA MOTOR CORPORATION, Hiroshima (JP)

(72) Inventors: Keitaro Ezumi, Hiroshima (JP); Michio Ito, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 26 days.

(21) Appl. No.: 14/424,987

(22) PCT Filed: Aug. 27, 2013

(86) PCT No.: PCT/JP2013/005036
§ 371 (c)(1),
(2) Date: Feb. 27, 2015

(87) PCT Pub. No.: WO2014/034088
PCT Pub. Date: Mar. 6, 2014

(65) Prior Publication Data
US 2015/0211468 A1 Jul. 30, 2015

(30) Foreign Application Priority Data

Aug. 29, 2012 (JP) ................................. 2012-188901

(51) Int. Cl.
*F02N 11/08* (2006.01)
*F02D 29/02* (2006.01)
*F02D 41/22* (2006.01)

(52) U.S. Cl.
CPC ........... *F02N 11/0818* (2013.01); *F02D 29/02* (2013.01); *F02N 11/0825* (2013.01); *F02D 2041/228* (2013.01); *Y02T 10/48* (2013.01)

(58) Field of Classification Search
CPC .... F02D 41/06; F02D 41/062; F02D 41/065; F02D 41/042; F02D 29/02; F02D 2041/228; F02N 11/08; F02N 11/0818; F02N 11/0825; F02N 11/0837; Y02T 10/44; Y02T 10/48

USPC .............. 701/101, 102, 112–115; 123/179.3, 123/179.4, 179.14, 198 D, 198 DB, 198 DC, 123/198 F
See application file for complete search history.

(56) References Cited

U.S. PATENT DOCUMENTS 7,860,636 B2 * 12/2010 Yamaguchi ..... B60W 30/18009
123/179.3
8,417,435 B2 * 4/2013 Yamaguchi ........... B60W 10/08
123/179.3

(Continued)

FOREIGN PATENT DOCUMENTS

JP       09-222035 A    8/1997
JP     2000-257498 A    9/2000

(Continued)

OTHER PUBLICATIONS

International Search Report; PCT/JP2013/005036; Dec. 3, 2013.

*Primary Examiner* — John Kwon
*Assistant Examiner* — Johnny H Hoang
(74) *Attorney, Agent, or Firm* — Studebaker & Brackett PC

(57) ABSTRACT

An automatic stop device for a vehicle engine includes: an automatic stop control unit which performs automatic engine stop when a predetermined automatic stop initiating condition is established while the vehicle is stopped, and prohibits automatic engine stop when the automatic stop initiating condition is not established; a restart control unit which performs automatic engine restart when a predetermined automatic stop cancelling condition is established after the engine is automatically stopped; and a storage unit which stores a cause of prohibiting automatic engine stop when automatic stop of the engine is prohibited while the vehicle is stopped, or a cause of performing automatic engine restart when the engine that has been automatically stopped is automatically restarted.

9 Claims, 8 Drawing Sheets

(56) References Cited

U.S. PATENT DOCUMENTS

| | | | |
|---|---|---|---|
| 2004/0214689 A1* | 10/2004 | Kaneko | F02D 17/04 477/203 |
| 2006/0095197 A1* | 5/2006 | Nishi | F02N 11/10 701/113 |
| 2006/0224279 A1* | 10/2006 | Mori | F02N 11/0833 701/1 |
| 2010/0106390 A1 | 4/2010 | Yamaguchi | |
| 2011/0160985 A1 | 6/2011 | Yamaguchi | |

FOREIGN PATENT DOCUMENTS

| | | |
|---|---|---|
| JP | 2006-125351 A | 5/2006 |
| JP | 2008-267266 A | 11/2006 |
| JP | 2007-278225 A | 10/2007 |
| JP | 2011-132896 A | 7/2011 |

\* cited by examiner

PATTERN 2

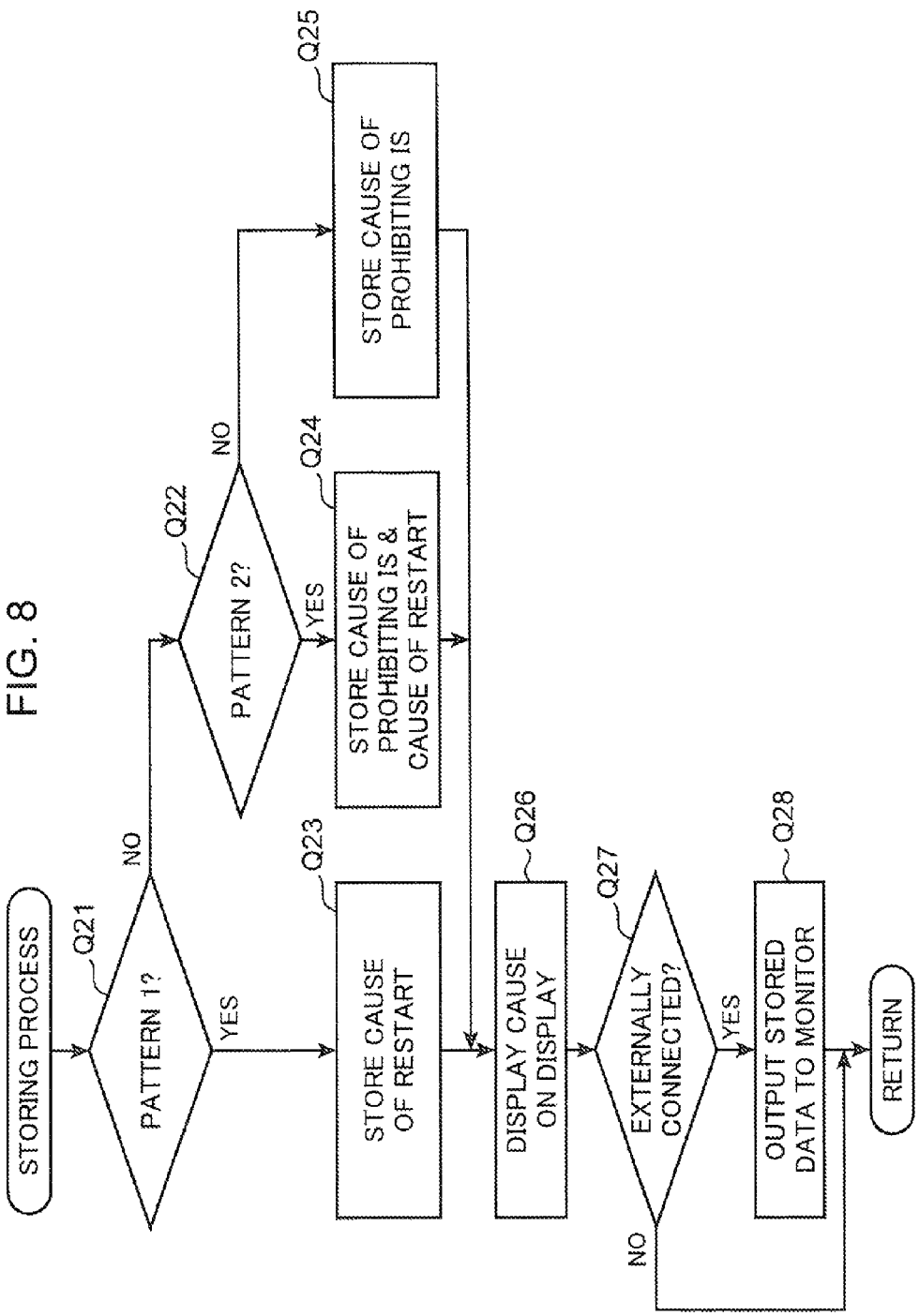

AUTOMATIC STOP DEVICE FOR VEHICLE ENGINES

TECHNICAL FIELD

The present invention relates to an automatic stop device for a vehicle engine configured to perform automatic engine stop and automatic engine restart.

BACKGROUND ART

Among the recent vehicles, vehicles which perform so-called "idle stop" of automatically stopping an engine while the vehicle is stopped have been increasing for fuel consumption enhancement. Automatic stop (idle stop) of an engine is performed when a predetermined automatic stop initiating condition is established. Generally, the automatic stop initiating condition is established, when all of predetermined requirements are satisfied. For instance, the automatic stop initiating condition is established, when all the requirements such as the vehicle speed is zero (i.e. the vehicle is stopped), a braking operation is performed, an acceleration operation is not performed, and the transmission is in a neutral state are satisfied.

Further, a predetermined automatic stop cancelling condition is set in order to automatically restart the engine that has been automatically stopped. Generally, the automatic stop cancelling condition is established when one or more requirements included in the automatic stop initiating condition is not satisfied (e.g. when the accelerator pedal is stepped on, or when a braking operation is released).

The automatic stop initiating condition of an engine is not always related to a driver's operation. For instance, when a battery charging amount is less, when a battery power consumption is large, when an engine coolant temperature or the engine oil temperature is low, when an oil temperature or a hydraulic pressure of the transmission is low, or when a difference between a preset temperature and an actual temperature of the air-conditioner is large (i.e. the air-conditioning request level is high), it is preferable not to perform automatic engine stop. When one or more of the aforementioned statuses is observed, it is desirable to prohibit automatic engine stop, even if all the requirements based on a driver's operation are satisfied.

As described above, automatic engine stop is prohibited by a variety of requirements that do not result from a driver's operation. Therefore, it is not easy for the driver to recognize in what condition automatic engine stop is prohibited. As a result, when automatic engine stop is not performed even though the vehicle is stopped, some of the drivers may be worried that the automatic stop device is out of order. Further, some of the drivers may be worried that automatic engine stop is not performed because of an inappropriate driver's operation while the vehicle is stopped, and may perform an unnecessary operation such as a hard braking operation.

The aforementioned phenomena may also occur when the engine is automatically restarted regardless of the absence of a driver's operation. For instance, automatic engine restart may be performed because of lowering of battery charging amount while the engine is automatically stopped. In such a case, the engine may be automatically restarted regardless of the absence of a driver's will to start. In this case, the driver may also be worried that the automatic stop device is out of order.

Further, automatic engine stop may be frequently prohibited, or an automatic engine stop time may be exceedingly shortened (i.e. the engine may be restarted immediately after automatic engine stop) due to some trouble of the vehicle. At the time of maintenance service of the vehicle, the maintenance engineer may be forced to check the presence or absence of such a trouble.

Patent Literature 1 discloses a self diagnosis device for an automatic stop device for an engine so as to appropriately perform automatic engine stop or automatic engine restart. However, Patent Literature 1 has failed to solve the aforementioned drawbacks.

CITATION LIST

Patent Literature

Patent Literature 1: Japanese Patent Publication No. 3,614,021

SUMMARY OF INVENTION

In view of the above, an object of the invention is to provide an automatic stop device for a vehicle engine that allows the driver to grasp a cause of prohibiting automatic engine stop or a cause of performing automatic engine restart.

In order to achieve the above object, an automatic stop device for a vehicle engine of the invention includes an automatic stop control unit which performs automatic engine stop when a predetermined automatic stop initiating condition is established while a vehicle is stopped, and prohibits automatic engine stop when the automatic stop initiating condition is not established; a restart control unit which performs automatic engine restart when a predetermined automatic stop cancelling condition is established after the engine is automatically stopped; and a storage unit which stores a cause of prohibiting automatic engine stop when automatic stop of the engine is prohibited while the vehicle is stopped, or a cause of performing automatic engine restart when the engine that has been automatically stopped is automatically restarted.

According to the invention, allowing the driver to grasp the storage contents stored in the storage unit makes it possible to keep the driver from worrying about the automatic stop device, and to provide the driver with a hint for fuel efficient driving. Further, the storage contents help the driver of early detection of anomaly or trouble.

BRIEF DESCRIPTION OF DRAWINGS

FIG. 8 is a flowchart illustrating a control example of the invention.

DESCRIPTION OF EMBODIMENTS

Figure 1:
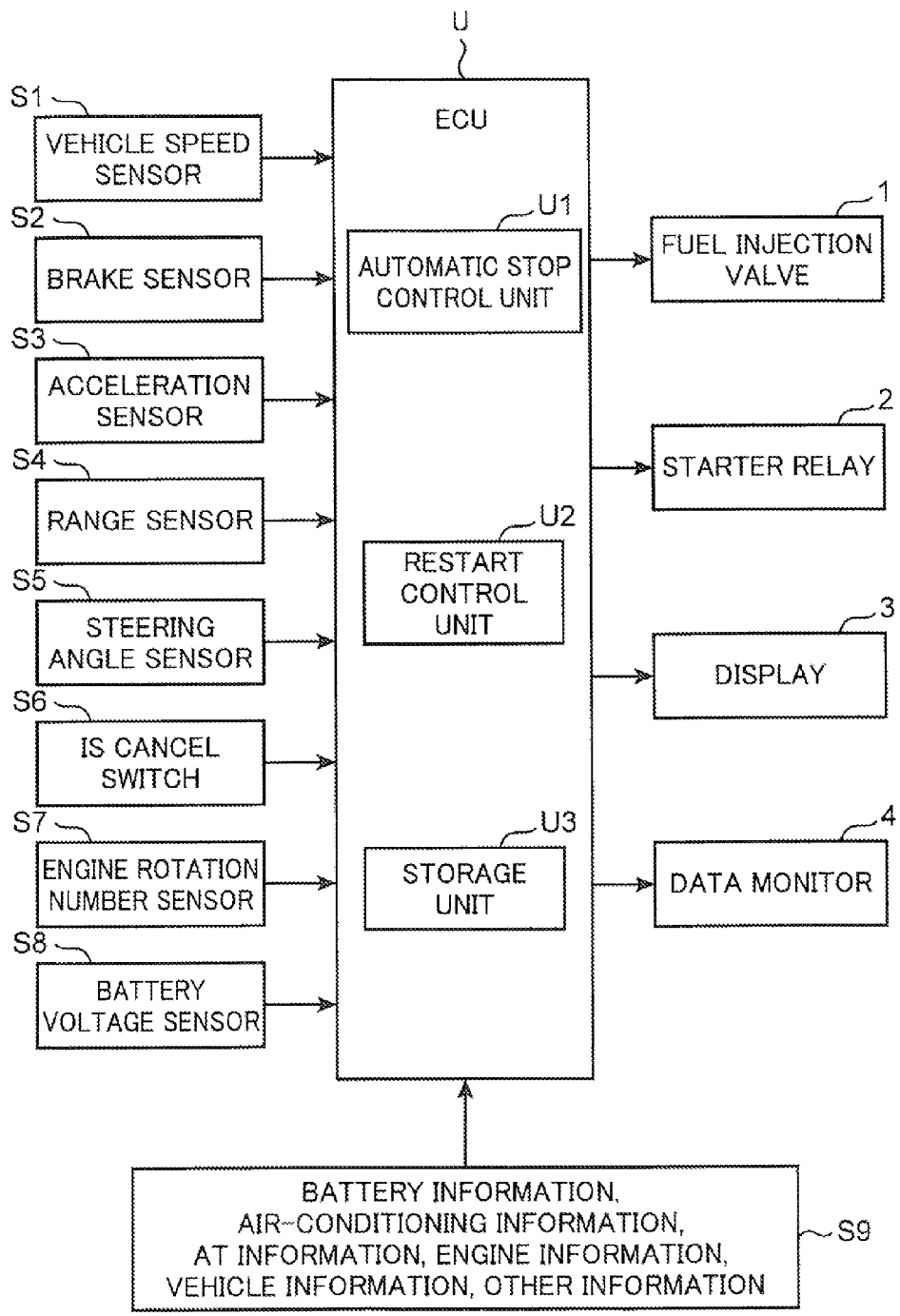
FIG. 1 is a control distribution diagram illustrating an embodiment of the invention.

Referring to FIG. 1, indicated at U is a controller, which is configured with use of a microcomputer. The controller U receives signals from a variety of sensors or switches S1 to S9 provided in an engine or in a vehicle. In the embodiment, examples of the sensors or switches are a vehicle speed sensor S1 which detects a vehicle speed (i.e. a driving speed of the vehicle), a brake sensor S2 which detects an operation state of a foot brake and of a parking brake, an acceleration sensor S3 which detects an operation state of an accelerator pedal, a range sensor S4 which detects a range of an automatic transmission (AT), a steering angle sensor S5 which detects a steering angle of a steering wheel, an IS cancel switch S6 which intentionally prohibits automatic stop control of an engine to be described later, an engine rotation number sensor S7 which detects a rotation number of the engine, and a battery voltage sensor S8 which detects a voltage of a battery. Further, in the embodiment, a sensor group S9 is provided in addition to the aforementioned sensors or switches S1 to S8. The sensor group S9 detects various kinds of information, other than the information to be detected by the sensors or switches S1 to S8, relating to the battery, an air-conditioner, the automatic transmission, the engine, the vehicle, and the like.

The controller U controls various devices provided in the engine or in the vehicle, based on the information to be input from the sensors or switches S1 to S9. In the embodiment, the controller U controls various devices including at least a fuel injection valve 1 which supplies fuel to the engine, a starter relay 2 which supplies electric power to a starter motor of the engine, and a display 3 (i.e. a display device) mounted on an instrument panel. Further, a data monitor 4 (i.e. a display device) is attachably and detachably connected to the controller U from the outside. When the data monitor 4 is connected to the controller U, the controller U provides various kinds of data to the data monitor 4.

The controller U functionally includes an automatic stop control unit U1, a restart control unit U2, and a storage unit U3.

The automatic stop control unit U1 of the controller U stops fuel injection from the fuel injection valve 1 in a predetermined condition, while the vehicle is stopped (i.e. when the vehicle speed becomes zero) so as to perform automatic engine stop.

The restart control unit U2 of the controller U executes a control of automatically restarting the engine that has been automatically stopped by the automatic stop control unit U1 in a predetermined condition. Specifically, the restart control unit U2 supplies electric power to the starter relay 2 for driving the starter motor, and resumes fuel injection from the fuel injection valve 1 so as to perform automatic engine restart. In the embodiment, automatic engine stop is permitted one time at most, each time the vehicle is stopped. Therefore, automatic engine restart is also performed one time at most, each time the vehicle is stopped.

The storage unit U3 of the controller U includes a non-volatile memory, and stores various kinds of data relating to automatic engine stop and automatic engine restart.

The aforementioned automatic engine stop is performed, when a predetermined automatic stop initiating condition is established. Further, the aforementioned automatic engine restart of automatically restarting the engine that has been automatically stopped is performed, when a predetermined automatic stop cancelling condition is established. The restart control unit U2 of the controller U determines whether the automatic stop initiating condition or the automatic stop cancelling condition is established, based on input signals from the sensors or switches S1 to S9.

In the embodiment, the automatic stop initiating condition is such that none of the requirements included in automatic stop prohibiting conditions 1 and 2 to be described below is satisfied. Specifically, when none of the following requirements (1) to (6) included in the automatic stop prohibiting condition 1, and the following requirements (7) to (14) included in the automatic stop prohibiting condition 2 is satisfied, it is defined that the automatic stop initiating condition is established. Conversely, when any one of the following requirements (1) to (14) is satisfied, it is defined that the automatic stop initiating condition is not established.

Further, in the embodiment, the automatic stop cancelling condition is such that one or more of the requirements included in the automatic stop prohibiting conditions 1 and 2 to be described below is satisfied. Specifically, when any one of the following requirements (1) to (6) included in the automatic stop prohibiting condition 1, and the following requirements (7) to (14) included in the automatic stop prohibiting condition 2 is satisfied, it is defined that the automatic stop cancelling condition is established. Conversely, when none of the following requirements (1) to (14) is satisfied, it is defined that the automatic stop cancelling condition is not established.

<Automatic Stop Prohibiting Condition 1>

The automatic stop prohibiting condition 1 results from a driver's operation, and include the following requirements (1) to (6).

(1) The vehicle speed to be detected by the vehicle speed sensor S1 is not zero.

(2) No operation of the foot brake and no operation of the parking brake (i.e. the brakes are in an OFF-state) are detected by the brake sensor S2.

(3) A stepping operation of the accelerator pedal (i.e. the accelerator pedal is in an ON-state) is detected by the acceleration sensor S3.

(4) A neutral state of the automatic transmission is detected by the range sensor S4.

(5) Deviation of the steering angle of the steering wheel detected by the steering angle sensor S5 from a predetermined small steering angle range with respect to a neutral position (i.e. the steering angle=0) is.

(6) The IS cancel switch S6 for prohibiting automatic engine stop by the driver's will is in an ON-state.

The requirement (4), namely, the requirement that the automatic transmission is in a neutral state naturally includes a case that the shift lever is set to a neutral position. However, the invention is not limited to the above. The vehicle in the embodiment is designed such that a specific friction coupling element of the automatic transmission is automatically locked or unlocked when the vehicle is stopped so as to establish a quasi neutral state. Therefore, even if the shift lever is in a drive position, completing the switching to establish a quasi neutral state makes it possible to satisfy the requirement (4).

<Automatic Stop Prohibiting Condition 2>

The automatic stop prohibiting condition 1 is a prohibiting condition based on system constraints that do not result from a driver's operation, and include the following requirements (7) to (14).

(7) The engine rotation number detected by the rotation number sensor S7 is equal to or larger than a predetermined rotation number (i.e. a value considerably larger than the idling rotation number when the engine is stable).

(8) The battery voltage detected by the battery voltage sensor S8 is equal to or smaller than a predetermined voltage.

(9) One of a state that a battery charging amount is equal to or smaller than a predetermined charging amount, a state that a battery consumption current is equal to or larger than a predetermined current, and a state that an anomaly has occurred in a battery control system is detected by a signal from the sensor group 9.

(10) A state that an air-conditioning request level of the air-conditioner in a vehicle interior is high (e.g. a preset air volume is large, a difference between an actual temperature and a manually preset temperature is large, or ambient temperature is extremely high or extremely low) is detected by a signal from the sensor group 9.

(11) One of a state that an oil temperature of the transmission is out of a predetermined temperature range, a state that a hydraulic pressure of the transmission is out of a predetermined pressure range, and a state that an anomaly has occurred in the transmission or in a clutch (including a lockup clutch) is detected by a signal from the sensor group 9.

(12) One of a state that the an engine coolant temperature is out of a predetermined temperature range, a state that an intake temperature is too high, a state that atmospheric pressure is too low, a state that a negative pressure to be supplied to a brake booster (a negative pressure type booster) is insufficient, and a state that an anomaly has occurred in the engine system is detected by a signal from the sensor group 9.

(13) One of a state that an ignition key is taken out of the vehicle (in the case of a smart keyless entry system), a state that a seat belt is unfastened, a state that one of the vehicle doors is opened, and a state that a hood is opened is detected by a signal from the sensor group 9.

(14) A steep road surface is detected by a signal from the sensor group 9.

The aforementioned automatic stop prohibiting conditions 1 and 2 are merely an example. It is needless to say that requirements other than the requirements (1) to (14) may be additionally included in the automatic stop prohibiting conditions, or part of the requirements (1) to (14) may be deleted. Further, in the embodiment, when none of the requirements (1) to (14) included in the automatic stop prohibiting conditions 1 and 2 is satisfied, the automatic stop initiating condition (i.e. condition to permit automatic engine stop) is established; and when any one of the requirements (1) to (14) included in the automatic stop prohibiting conditions 1 and 2 is satisfied, the automatic stop cancelling condition (i.e. condition to automatically restart the engine that has been automatically stopped) is established. Thus, the automatic stop initiating condition and the automatic stop cancelling condition are completely opposite conditions from each other. However, the relationship between the automatic stop initiating condition and the automatic stop cancelling condition may not necessarily be the relationship as described above. It is possible to set some requirements to be considered only when it is determined whether the automatic stop initiating condition is established, or it is possible to set some requirements to be considered only when it is determined whether the automatic stop cancelling condition is established.

The automatic stop prohibiting condition 1 including the requirements relating to a braking operation, an acceleration operation, or a steering angle of a steering wheel results from a driver's operation. Therefore, when automatic engine stop is prohibited or automatic engine restart is performed because at least one of the requirements of the automatic stop prohibiting condition 1 is satisfied, the driver can relatively easily recognize the cause of automatic engine stop or automatic engine restart.

On the other hand, the automatic stop prohibiting condition 2 including the requirements relating to a battery, a transmission, or an air-conditioner is not basically related to a driver's operation. Therefore, when automatic engine stop is prohibited or automatic engine restart is performed because at least one of the requirements of the automatic stop prohibiting condition 2 is satisfied, the driver cannot promptly recognize the cause of automatic engine stop or automatic engine restart. This may make the driver feel that the automatic stop device is in an anomalous state. In view of the above, the configuration as described below is proposed in the embodiment.

Figure 2:
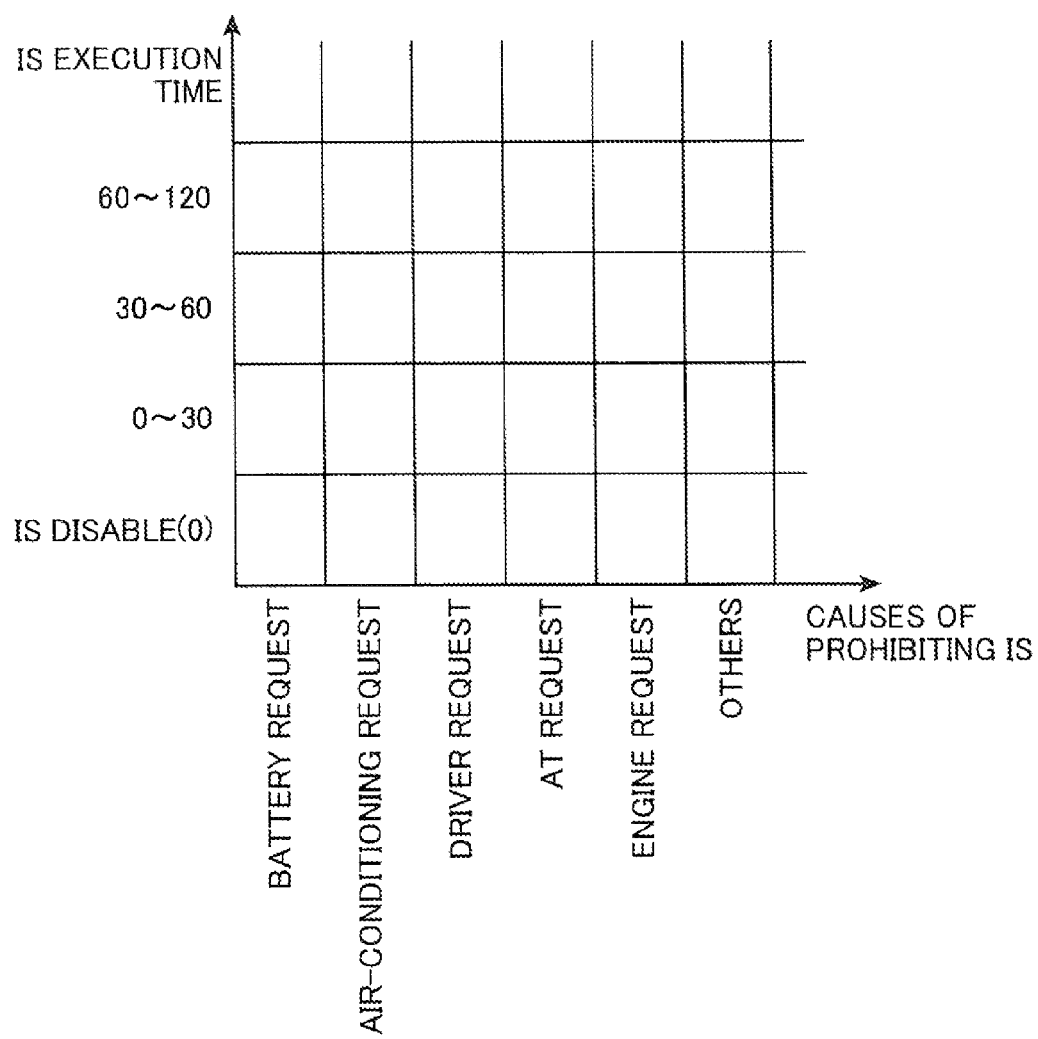
FIG. 2 is a diagram illustrating an example of a map for use in storing causes when automatic engine stop is prohibited.
Figure 3:
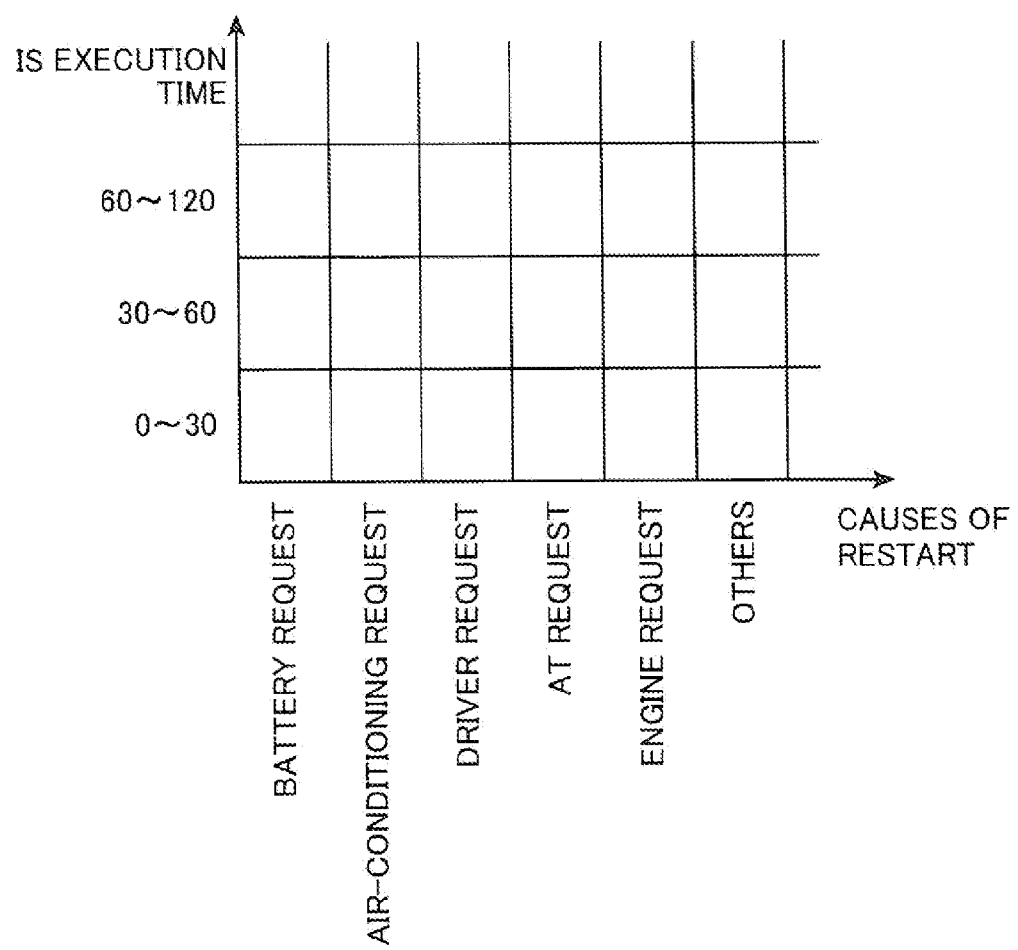
FIG. 3 is a diagram illustrating an example of a map for use in storing causes when automatic engine restart is performed.

FIG. 2 and FIG. 3 are diagrams illustrating an example of maps to be stored in the storage unit U3 of the controller U. FIG. 2 is a diagram illustrating a map for use in storing the causes of prohibiting automatic engine stop. FIG. 3 is a diagram illustrating a map for use in storing the causes of restarting the engine that has been automatically stopped.

First of all, the contents of the map illustrated in FIG. 2 for use in storing the causes of prohibiting automatic engine stop are described. Cause items representing causes of prohibiting automatic engine stop while the vehicle is stopped (i.e. causes of establishing the automatic stop initiating condition) are set along the horizontal axis (X-axis) in FIG. 2. The cause items are items obtained by classifying the requirements (1) to (14) included in the aforementioned automatic stop prohibiting conditions 1 and 2 according to the type of cause. Specifically, in the embodiment, the cause items of prohibiting automatic engine stop are classified into the item "BATTERY REQUEST", which represents a cause resulting from a battery, the item "AIR-CONDITIONING REQUEST", which represents a cause resulting from an air-conditioner, the item "DRIVER REQUEST", which represents a cause resulting from a driver's operation, the item "AT REQUEST", which represents a cause resulting from the automatic transmission (AT), the item "ENGINE REQUEST", which represents a cause resulting from the engine, and the item "OTHERS", which represents causes other than the above. Each of the cause items may include two or more of the requirements (1) to (14). For instance, the item "BATTERY REQUEST" includes two or more causes such as the battery voltage being small, the battery charging amount being less, and the battery consumption current being large (the requirements (8) and (9)).

An automatic stop execution time (i.e. an IS execution time), which is a period of time during which automatic stop (idle stop) of the engine is continued, is set along the vertical axis (Y-axis) in FIG. 2. The automatic stop execution time in FIG. 2 is used, when automatic engine stop is performed, because the automatic stop initiating condition is established (i.e. none of the requirements (1) to (14) included in the prohibiting conditions 1 and 2 is satisfied) after automatic engine stop is temporarily prohibited while the vehicle is stopped. Therefore, the automatic stop execution time when automatic engine stop is performed substantially concurrently when the vehicle is stopped (i.e. when automatic engine stop is not prohibited) is not included in the automatic stop execution time in FIG. 2. The automatic stop execution time along the vertical axis is classified into time ranges. The lowermost item "IS DISABLE (no idle stop)" corresponds to a case in which the automatic stop execution time is zero.

Referring to the map in FIG. 2, when automatic engine stop is prohibited because the battery charging amount is less while the vehicle is stopped, the cause of prohibiting automatic engine stop corresponds to the cause item "BATTERY REQUEST". Then, the count number in one of memory blocks that satisfies the automatic stop execution time on the column "BATTERY REQUEST" (i.e. the leftmost column in FIG. 2) is increased. For instance, when prohibiting automatic engine stop is continued until the vehicle starts again (i.e. when automatic engine stop is not performed at all), the automatic stop execution time is zero. In this case, the count number in the memory block (i.e. the lowermost and leftmost memory block) where the column "BATTERY REQUEST" and the row "IS DISABLE" intersect is increased. Further, for instance, when automatic engine stop is temporarily prohibited because the battery charging amount is less, but automatic engine stop is performed because the charging amount has recovered thereafter, and then, the automatic engine stop is continued for forty seconds (i.e. when the automatic stop execution time is forty seconds), the count number in the memory block on the third row and the first column where the column "BATTERY REQUEST" and the row "30-60" intersect is increased. The count number in each memory block is incremented by one, each time automatic engine stop is prohibited by the cause item corresponding to each memory block and automatic engine stop is performed during the time period corresponding to each memory block.

The cause of prohibiting automatic engine stop is not limited to one, but may be two or more causes. In such a case, the count numbers in memory blocks belonging to all the columns of the relevant cause items (and satisfying the automatic stop execution time) are respectively increased. For instance, when automatic engine stop is prohibited by both of the causes i.e. the battery charging amount is less and the air-conditioning request level is high, the count numbers in two memory blocks belonging to the column "BATTERY REQUEST" and the column "AIR-CONDITIONING REQUEST" are respectively increased.

Next, the contents of the map illustrated in FIG. 3 for use in storing the causes of performing automatic engine restart are described. Cause items representing causes of automatically restarting the engine that has been automatically stopped (i.e. causes of establishing the automatic stop cancelling condition) are set along the horizontal axis (X-axis) in FIG. 3. In the embodiment, as described above, the automatic stop initiating condition and the automatic stop cancelling condition are set based on the same requirements (1) to (14) (i.e. the automatic stop prohibiting conditions 1 and 2). Therefore, the cause items of performing automatic engine restart which are set along the horizontal axis in FIG. 3 are the same cause items of prohibiting automatic engine stop illustrated in FIG. 2. Specifically, in the embodiment, the cause items of performing automatic engine restart are classified into the item "BATTERY REQUEST", which represents a cause resulting from a battery, the item "AIR-CONDITIONING REQUEST", which represents a cause resulting from an air-conditioner, the item "DRIVER REQUEST", which represents a cause resulting from a driver's operation, the item "AT REQUEST", which represents a cause resulting from the automatic transmission (AT), the item "ENGINE REQUEST", which represents a cause resulting from the engine, and the item "OTHERS", which represents causes other than the above. Each of the cause items may include two or more of the requirements (1) to (14).

Further, an automatic stop execution time (i.e. a time period from automatic engine stop to automatic engine restart) when the engine that has been automatically stopped is automatically restarted is set along the vertical axis (Y-axis) in FIG. 3 in a state that the automatic stop execution time is classified into time ranges. Unlike the map illustrated in FIG. 2, the map illustrated in FIG. 3 is always used when the engine that has been automatically stopped is automatically restarted (i.e. the map is used even when automatic engine stop is not prohibited). Therefore, unlike the automatic stop execution time in the map illustrated in FIG. 2, the automatic stop execution time in the map illustrated in FIG. 3 includes an automatic stop execution time when the engine is automatically stopped substantially concurrently when the vehicle is stopped (i.e. when automatic engine stop is not prohibited).

In the map illustrated in FIG. 3, when the engine that has been automatically stopped is automatically restarted because of lowering of the battery charging amount while the vehicle is stopped, the cause item "BATTERY REQUEST" is the cause of performing automatic engine restart after the automatic engine stop. In this case, the count number in one of the memory blocks that satisfies the automatic stop execution time on the column "BATTERY REQUEST" (i.e. the leftmost column in FIG. 3) is increased. The count number in each of the memory blocks is incremented by one, each time automatic engine stop is performed during the time period corresponding to each memory block and automatic engine restart is performed by the cause item corresponding to each memory block.

Further, when automatic engine restart is performed by two or more causes, the count numbers in two or more memory blocks belonging to all the columns of relevant cause items (and satisfying the automatic stop execution time) are respectively increased. For instance, assuming that automatic engine restart is performed by two causes i.e. the battery charging amount is less and the air-conditioning request level is high, the count numbers in two memory blocks belonging to the column "BATTERY REQUEST" and the column "AIR-CONDITIONING REQUEST" are respectively increased.

In the embodiment, increasing the count number in a specific memory block in the map illustrated in FIG. 2 in accordance with prohibiting automatic engine stop means that the degree of influence of each of the cause items illustrated along the horizontal axis in FIG. 2 is specified. For instance, referring to FIG. 2, the sum of count numbers in the memory blocks whose corresponding cause items along the horizontal axis are identical to each other (i.e. belonging to a specific column) represents the number of serving times which is the number of times when the cause item serves as a cause of prohibiting automatic engine stop. It can be said that the larger the number of serving times is, the stronger the cause item acts as a cause of prohibiting automatic engine stop, and the larger the degree of influence is. Further, for instance, from the count number in each of the memory blocks whose corresponding cause items along the horizontal axis are identical to each other (i.e. belonging to a specific column), and from the automatic stop execution time of each of the memory blocks, it is possible to obtain an average value of automatic stop execution times when automatic engine stop is prohibited by the cause item (and thereafter, when automatic engine stop is performed). In other words, the shorter the average value of automatic stop execution times is, the longer the time when automatic engine stop is prohibited is. Therefore, it can be said that the cause item whose automatic stop execution time is short strongly acts as a cause of prohibiting automatic engine stop, and the degree of influence is large. In this way, in the embodiment, cause items obtained by classifying the causes of prohibiting automatic engine stop according to the type of cause, and data representing the degree of influence of each of the cause items on prohibiting automatic engine stop are stored in association with each other, with use of the map illustrated in FIG. 2.

Further, in the embodiment, increasing the count number in a specific memory block in the map illustrated in FIG. 3 in accordance with performing automatic engine restart means specifying each of the degrees of influence of each of the cause items illustrated along the horizontal axis in FIG. 3. For instance, referring to FIG. 3, the sum of count numbers in the memory blocks whose corresponding cause items along the horizontal axis are identical to each other (i.e. belonging to a specific column) represents the number of serving times which is the number of times when the cause item serves as a cause of performing automatic engine restart. It can be said that the larger the number of serving times is, the stronger the cause item acts as a cause of performing automatic engine restart, and the larger the degree of influence is. Further, for instance, from the count number in each of the memory blocks whose corresponding cause items along the horizontal axis are identical to each other (i.e. belonging to a specific column), and from the automatic stop execution time of each of the memory blocks, it is possible to obtain an average value of automatic stop execution times when automatic engine restart is performed by the cause item. In other words, the shorter the average value of automatic stop execution times is, the more promptly the engine that has been automatically stopped is restarted. Therefore, it can be said that the cause item whose automatic stop execution time is short strongly acts as a cause of performing automatic engine restart, and the degree of influence is large. In this way, in the embodiment, cause items obtained by classifying the causes of performing automatic engine restart according to the type of cause, and data representing the degree of influence of each of the cause items on performing automatic engine restart are stored in association with each other, with use of the map illustrated in FIG. 3.

Figure 4:
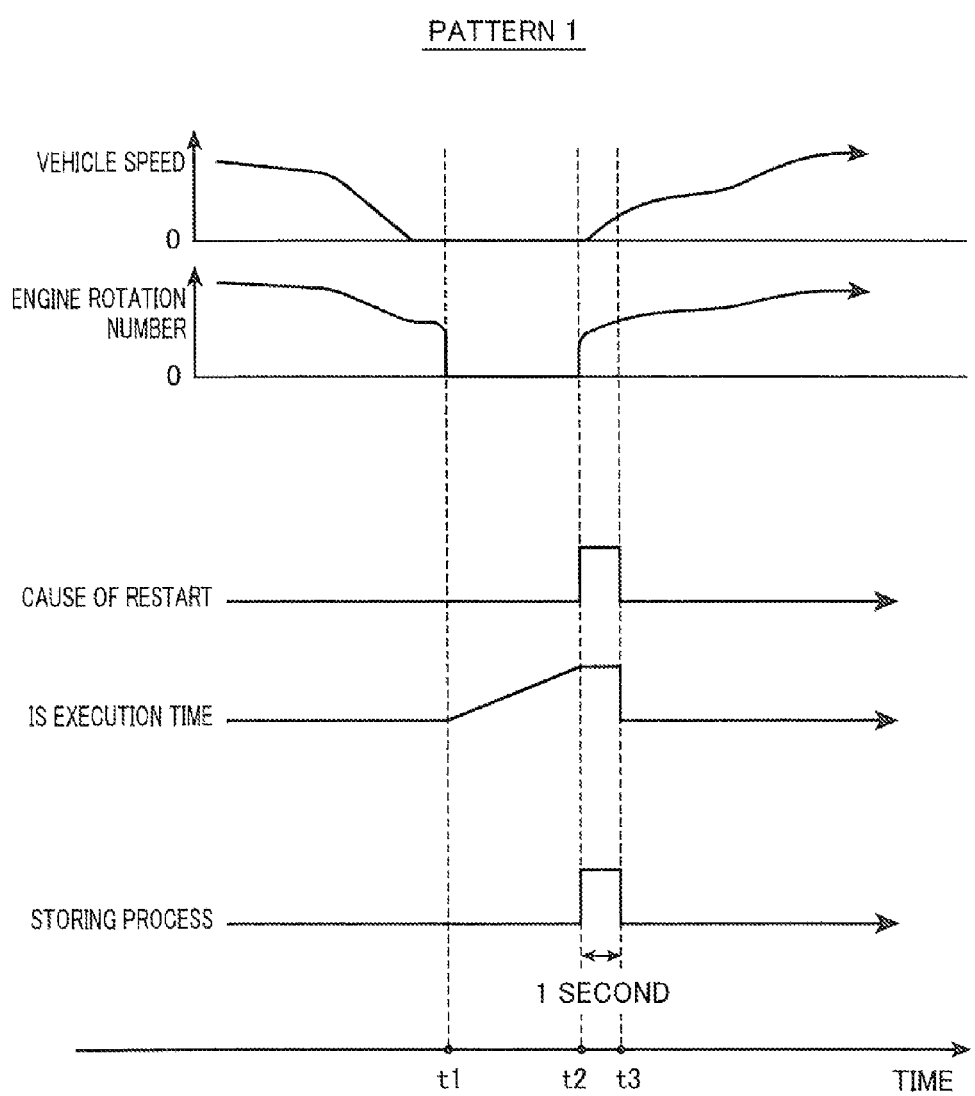
FIG. 4 is a time chart illustrating a control example when automatic engine stop is performed.

FIG. 4 is a time chart illustrating a control example when the engine is automatically stopped. Specifically, the time chart in FIG. 4 illustrates a control example, in which the engine is automatically stopped substantially concurrently when the vehicle is stopped, and thereafter, the engine is automatically restarted. In the following, the operation pattern as illustrated in FIG. 4 is called as "pattern 1".

In the pattern 1 illustrated in FIG. 4, first of all, the running vehicle is decelerated until the vehicle speed becomes zero (i.e. the vehicle is stopped), and at the point of time t1 immediately after the vehicle stop, it is confirmed that none of the requirements (1) to (14) of the automatic stop prohibiting conditions 1 and 2 is satisfied, and the automatic stop initiating condition is established. Concurrently with the establishment, automatic engine stop is initiated, and immediately after the initiation of automatic engine stop, the engine rotation number is lowered from the idling rotation number to zero.

An automatic stop execution time (i.e. an IS execution time) is started to be measured from the point of time t1 when automatic engine stop is initiated. The automatic stop execution time is a period of time during which automatic stop of the engine is continued. Therefore, the automatic stop execution time is extended in proportion to an elapse of a time from the point of time t1 when the automatic engine stop is initiated.

At the point of time t2 after an elapse of a predetermined time from the point of time t1 when automatic engine stop is initiated, it is confirmed whether one or more of the requirements (1) to (14) is satisfied, and the automatic stop cancelling condition is established. Concurrently with the establishment, automatic engine restart is initiated, and immediately after the automatic engine restart, the engine rotation number is increased to the idling rotation number.

At the point of time t2 when automatic engine restart is initiated, measuring the automatic stop execution time is finished. Thereby, an elapse of a time (t2−t1) from the point of time t1 when automatic engine stop is initiated to the point of time t2 when automatic engine restart is initiated is defined as an automatic stop execution time. Thereafter, at the point of time t3 after an elapse of one second from the point of time t2 when automatic engine restart is initiated, a process of storing the cause of performing automatic engine restart in the map of FIG. 3 is carried out.

Specifically, the count number in a specific memory block belonging to the column of cause item (horizontal axis) corresponding to the cause of performing automatic engine restart at the point of time t2, and belonging to the row of automatic stop execution time (vertical axis) corresponding to an elapse of a time from the point of time t1 to the point of time t2 is increased. For instance, it is assumed that the automatic stop cancelling condition is established because of lowering of the battery charging amount (requirement (14)), and therefore, automatic engine restart is performed, and an elapse of a time from the point of time t1 when automatic engine stop is initiated to the point of time t2 when automatic engine restart is initiated is forty seconds. In this case, "BATTERY REQUEST" is the cause of performing automatic engine restart indicated along the horizontal axis in FIG. 3, and "30-60" seconds is the automatic stop execution time indicated along the vertical axis in FIG. 3. Therefore, the count number in the memory block on the second row and the first column where the column "BATTERY REQUEST" and the row "30-60" intersect is incremented by one, and the updated count number is stored.

Figure 5:
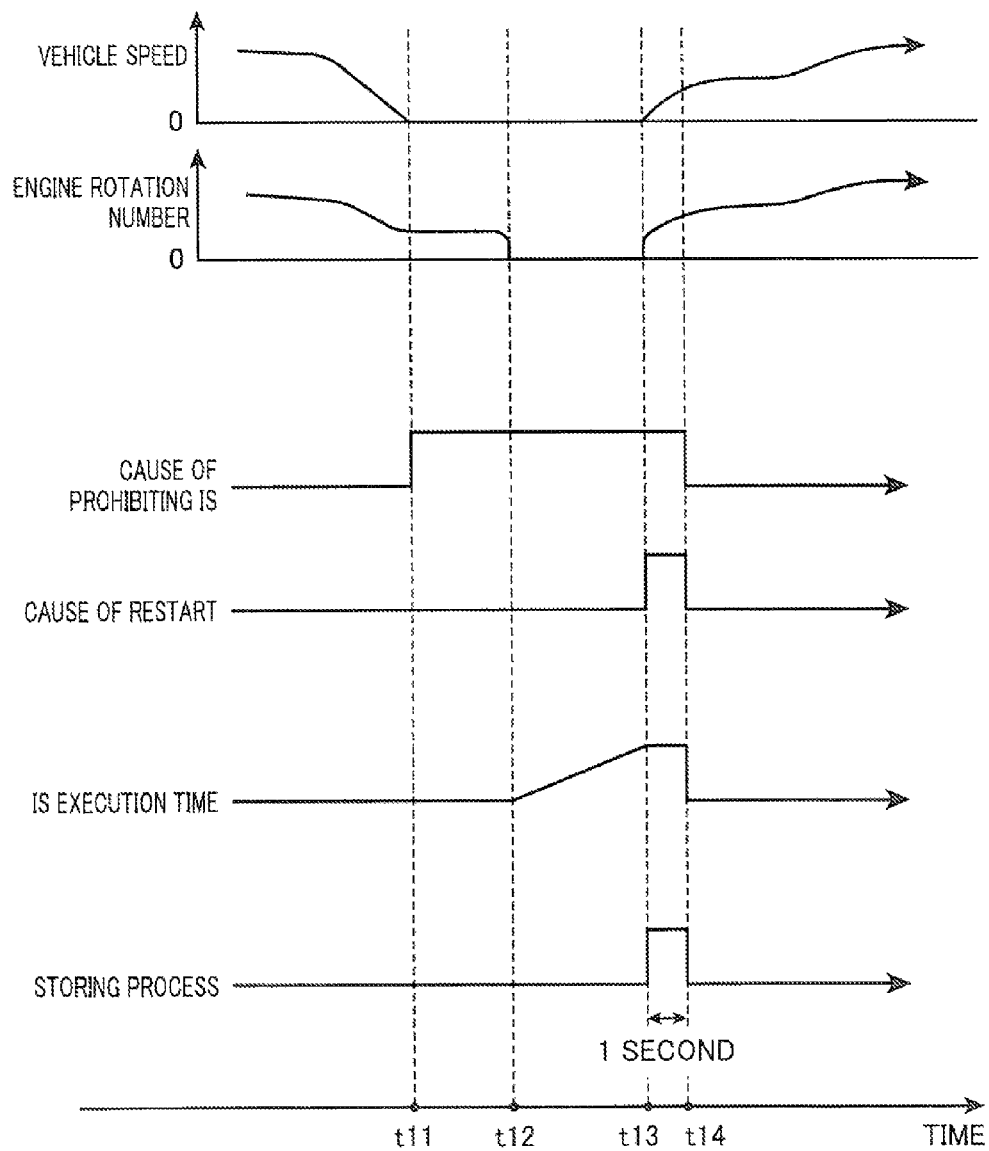
FIG. 5 is a time chart illustrating a control example when automatic engine stop is permitted after automatic engine stop is temporarily prohibited.

FIG. 5 is a time chart illustrating a control example, in which the engine is not automatically stopped (i.e. automatic engine stop is prohibited) regardless that the vehicle is stopped. Specifically, the time chart in FIG. 5 illustrates a control example, in which automatic engine stop is prohibited at the point of time when the vehicle is stopped, but automatic engine stop is permitted by a change in the vehicle state thereafter, and then, automatic engine restart is performed. In the following, the operation pattern as illustrated in FIG. 5 is called as "pattern 2".

In the pattern 2 illustrated in FIG. 5, at the point of time t11, the vehicle is stopped, and the vehicle speed becomes zero. At the point of time t11 when the vehicle is stopped, however, the automatic stop initiating condition is not established (i.e. one or more of the requirements (1) to (14) is satisfied). Therefore, automatic engine stop is not initiated, and the engine rotation number remains the same as the idling rotation number.

Thereafter, none of the requirements (1) to (14) is satisfied, and accordingly, the automatic stop initiating condition is established at the point of time t12. Concurrently with the establishment, automatic engine stop is initiated, and immediately after the automatic engine stop, the engine rotation number is lowered from the idling rotation number to zero.

At the point of time t13 after an elapse of a predetermined time from the point of time t12 when automatic engine stop is initiated, the automatic stop cancelling condition is established (i.e. one or more of the requirements (1) to (14) is satisfied). Concurrently with the establishment, automatic engine restart is initiated, and immediately after the automatic engine restart, the engine rotation number is increased to the idling rotation number. Thereafter, at the point of time t14 after an elapse of one second from the point of time t13 when automatic engine restart is initiated, a process of storing the cause of prohibiting automatic engine stop and the cause of performing automatic engine restart in the map of FIG. 2 and in the map of FIG. 3 is carried out.

Specifically, in the map of FIG. 2 storing the causes of prohibiting automatic engine stop, the count number in a specific memory block belonging to the column of cause item (horizontal axis) corresponding to the cause of prohibiting automatic engine stop at the point of time t11 and belonging to the row of automatic stop execution time (vertical axis) corresponding to an elapse of a time from the point of time t12 to the point of time t13 is increased. Further, in the map of FIG. 3 storing the causes of performing automatic engine restart, the count number in a specific memory block belonging to the column of cause item (horizontal axis) corresponding to the cause of performing automatic engine restart at the point of time t13 and belonging to the row of automatic stop execution time (vertical axis) corresponding to an elapse of a time from the point of time t12 to the point of time t13 is increased.

For instance, it is assumed that automatic engine stop is temporarily prohibited because of lowering of the battery charging amount (requirement (14)) (at the point of time t11), and at the point of time t12 after the temporary prohibiting, automatic engine stop is performed. Further, it is assumed that automatic engine restart is performed because a stepping operation of the foot brake is released (requirement (2)), and an elapse of a time from the point of time t12 when automatic engine stop is initiated to the point of time t13 when automatic engine restart is initiated is fifteen seconds. In this case, "BATTERY REQUEST" is the cause of prohibiting automatic engine stop indicated along the horizontal axis in FIG. 2, and "0-30" seconds is the automatic stop execution time indicated along the vertical axis in FIG. 2. Therefore, the count number in the memory block on the second row and the first column in FIG. 2 where the column "BATTERY REQUEST" and the row "0-30" intersect is incremented by one, and the updated count number is stored. Further, "DRIVER REQUEST" is the cause of performing automatic engine restart indicated along the horizontal axis in FIG. 3, and "0-30" seconds is the automatic stop execution time indicated along the vertical axis in FIG. 3. Therefore, the count number in the memory block on the first row and the third column in FIG. 3 where the column "DRIVER REQUEST" and the row "0-30" intersect is incremented by one, and the updated count number is stored.

Figure 6:
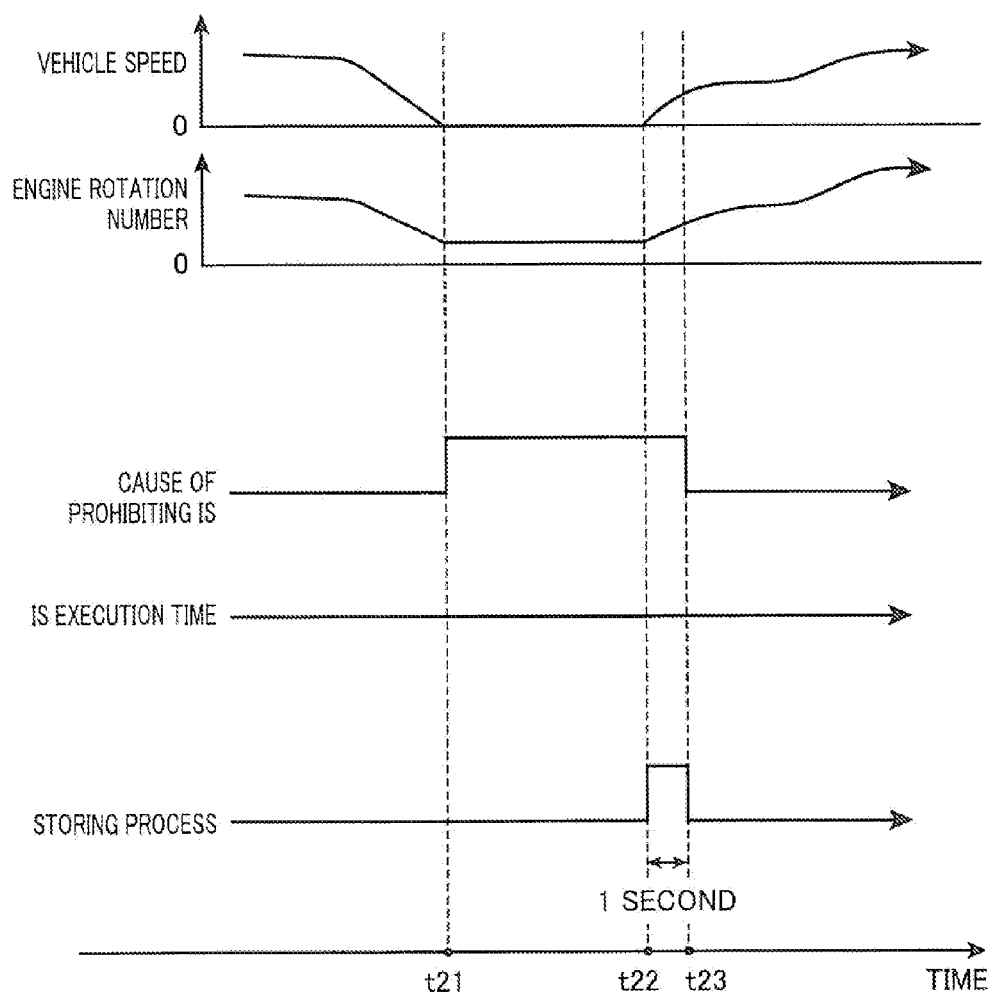
FIG. 6 is a time chart illustrating a control example when automatic engine stop is prohibited during a whole period when a vehicle is stopped.

FIG. 6 is a time chart illustrating another control example, in which automatic engine stop is prohibited while the vehicle is stopped. Specifically, the time chart in FIG. 6 illustrates a control example, in which automatic engine stop is prohibited while the vehicle is stopped, and the prohibited state is continued until the vehicle starts. In the following, the operation pattern as illustrated in FIG. 6 is called as "pattern 3".

In the pattern 3 illustrated in FIG. 6, at the point of time t21, the vehicle is stopped, and the vehicle speed becomes zero. However, at the point of time t21 when the vehicle is stopped, the automatic stop initiating condition is not established (i.e. one or more of the requirements (1) to (14) is satisfied). Therefore, automatic engine stop is not initiated, and the engine rotation number is remained the same as the idling rotation number. Thereafter, the vehicle starts without establishing the automatic stop initiating condition, and the vehicle speed exceeds zero at the point of time t22. Then, at the point of time t23 after an elapse of one second from the point of time t22 when the vehicle has started, a process of storing the cause of prohibiting automatic engine stop in the map of FIG. 2 is carried out.

Specifically, the count number in a specific memory block that satisfies the automatic stop execution time (vertical axis) on the column of the cause item (horizontal axis) corresponding to the cause of prohibiting automatic engine stop at the point of time t21 is increased. In the pattern 3 of FIG. 6, automatic engine stop is not performed at all. Therefore, the automatic stop execution time is zero. Thus, the memory block whose count number is increased is the memory block belonging to the row "IS DISABLE" in FIG. 2.

The contents stored in the map as illustrated in FIG. 2 and in the map as illustrated in FIG. 3 are allowed to be displayed on the display 3 mounted on the instrument panel at any time. According to this configuration, even if the driver feels that automatic engine stop is not so frequently performed, the driver can notice that automatic engine stop is prohibited, for instance, because the battery charging amount is less by viewing the storage contents displayed on the display 3. Thus, the driver can recognize that the automatic stop device is not in an anomalous state. Further, the maintenance engineer of the vehicle can advise the driver of supplementary charging of the battery.

Figure 7:
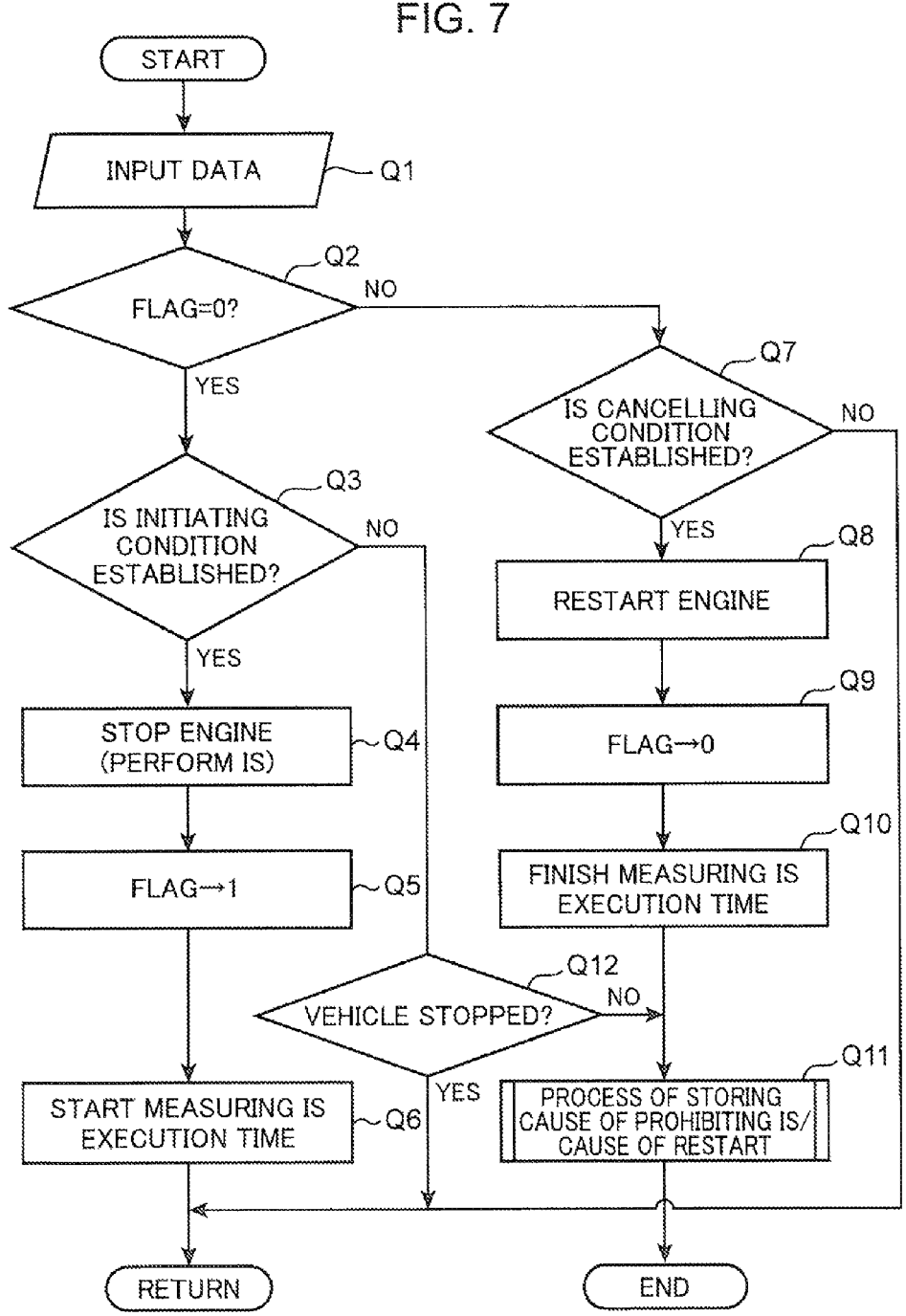
FIG. 7 is a flowchart illustrating a control example of the invention.

Next, a control example of automatic engine stop and automatic engine restart to be performed by the controller U is described referring to the flowcharts of FIG. 7 and FIG. 8. In the following description, indicated at Q is a step.

The control illustrated by the flowchart of FIG. 7 is started when the running vehicle is stopped (i.e. the vehicle speed is changed from a value other than zero to zero). In Q1, signals from the sensors or switches S1 to S9 are input to the controller U. Thereafter, in Q2, it is determined whether the flag is set to 0. A state that the flag is set to 1 represents that automatic engine stop is executed, and a state that the flag is set to 0 represents that automatic engine stop is not executed. The flag is initially set to 0.

At the point of time when the control illustrated in FIG. 7 is started (i.e. immediately after the vehicle is stopped), the engine is not stopped. Therefore, the first time determination in Q2 is YES. Then, in Q3, it is determined whether the automatic stop initiating condition is established. When it is confirmed that none of the requirements (1) to (14) of the automatic stop prohibiting conditions 1 and 2 is satisfied, the determination in Q3 is YES. When the determination in Q3 is YES, in Q4, the engine is automatically stopped. Specifically, fuel cut of stopping fuel injection from the fuel injection valve 1 is performed to stop the engine. Thereafter, in Q5, the flag is set to 1 so as to indicate that the engine is in an automatically stopped state. Thereafter, in Q6, the automatic stop execution time is started to be measured.

After Q6, the process returns to Q1. At the point of time when the process returns to Q1, the flag is set to 1. Therefore, the determination in Q2 after Q6 is NO. Then, the process is proceeded to Q7, and it is determined whether the automatic stop cancelling condition is established. When it is confirmed that none of the requirements (1) to (14) of the automatic stop prohibiting conditions 1 and 2 is satisfied, the determination in Q7 is NO. When the determination in Q7 is NO, the process returns to Q1 to continue the automatic engine stop. Further, as the automatic engine stop is continued, the measured automatic stop execution time also increases.

On the other hand, when the determination in Q7 is YES, in other words, when one or more of the requirements (1) to (14) is satisfied, and the automatic stop cancelling condition is established, in Q8, the engine is automatically restarted. Specifically, the starter motor is driven, and fuel injection from the fuel injection valve 1 is resumed to restart the engine. Thereafter, in Q9, the flag is reset to 0, and in Q10, measuring the automatic stop execution time is finished.

After Q10, in Q11, the cause of performing automatic engine restart is stored in the storage unit U3. Specifically, the count number in a specific memory block where the cause item (horizontal axis) of performing automatic engine restart and the automatic stop execution time (vertical axis) in the map of FIG. 3 intersect is increased, and data representing the updated count number is newly stored. In this way, when the first time determination in Q3 is YES (i.e. when automatic engine stop is permitted immediately after the vehicle is stopped), only the map illustrated in FIG. 3 is used via Q10 and Q11, and the cause of performing automatic engine restart is stored.

Next, there is described a control to be performed when the determination in Q3 is NO, in other words, when the automatic stop initiating condition is not established because one or more of the requirements (1) to (14) is satisfied regardless that the vehicle is stopped. When the determination in Q3 is NO, the process is proceeded to Q12 (i.e. skipping Q4 and thereafter) so as to prohibit automatic engine stop. Then, in Q12, it is determined whether the vehicle is in a stopped state. When the determination in Q12 is YES, the process returns to Q1.

When it is confirmed that the determination in Q12 is NO, and the vehicle has started, in Q11, the cause of prohibiting automatic engine stop is stored in the storage unit U3. Specifically, the count number in a specific memory block where the cause item (horizontal axis) of prohibiting automatic engine stop and the automatic stop execution time (vertical axis) in the map of FIG. 2 intersect is increased, and data representing the updated count number is newly stored. It should be noted that the automatic stop execution time is always zero in this case. In this way, when the process is carried out to Q11 via Q12, (i.e. when the vehicle starts without permitting automatic engine stop after vehicle stop), only the map illustrated in FIG. 2 is used, and the cause of prohibiting automatic engine stop is stored.

On the other hand, there is a case, in which the automatic stop initiating condition is established before the vehicle starts (i.e. during a period of time when the determination in Q12 is YES), and the determination in Q3 is YES. In this case, the process is carried out from Q4 to Q6 so as to perform automatic engine stop. Thereafter, the automatic engine stop is continued until the determination in Q7 becomes YES. Then, at the point of time when the determination in Q7 becomes YES, and the automatic stop cancelling condition is established, automatic engine restart is performed via the process of Q8 and thereafter. In this way, when the determination in Q3 becomes YES before the vehicle starts, automatic engine stop is prohibited, and in addition, the engine that has been automatically stopped is automatically restarted. Therefore, in this case, when the process is proceeded to Q11, both of the map illustrated in FIG. 2 and the map illustrated in FIG. 3 are used, and the cause of prohibiting automatic engine stop and the cause of performing automatic engine restart are respectively stored in the storage unit U3.

FIG. 8 is a flowchart of a subroutine illustrating the details of the processing contents in Q11 illustrated in FIG. 7. When the subroutine starts, in Q21, it is determined whether the operation pattern performed while the vehicle is stopped is the pattern 1 illustrated in FIG. 4. As described above, the pattern 1 is a pattern, in which the automatic stop initiating condition of the engine is established (YES in Q3) immediately after the vehicle is stopped, and automatic engine restart is performed because the automatic stop cancelling condition is established (YES in Q7) after establishment of the automatic stop initiating condition. Therefore, when the first time determination in Q3 is YES, it possible to determine that the operation pattern is the pattern 1.

When it is confirmed that the determination in Q21 is YES, and it is confirmed that the operation pattern is the pattern 1, in Q23, only the map data in FIG. 3 is updated, and the cause of preforming automatic engine restart is stored.

On the other hand, when the determination in Q21 is NO, in Q22, it is determined whether the operation pattern performed while the vehicle is stopped is the pattern 2 illustrated in FIG. 5. As described above, the pattern 2 is a pattern, in which automatic engine stop is prohibited (NO in Q3) at the point of time when the vehicle is stopped, but the automatic stop initiating condition is established (YES in Q3) by a change in the vehicle state thereafter, and automatic engine restart is performed because the automatic stop cancelling condition is established (YES in Q7) after establishment of the automatic stop initiating condition. Therefore, when at least the first time determination in Q3 is NO, and thereafter, when the determination in Q3 is changed to YES, it is possible to determine that the operation pattern is the pattern 2.

When the determination in Q22 is YES, and it is confirmed that the operation pattern is the pattern 2, in Q24, both of the map data in FIG. 2 and the map data in FIG. 3 are updated, and the cause of prohibiting automatic engine stop and the cause of performing automatic engine restart are respectively stored.

On the other hand, when the determination in Q22 is NO, the operation pattern performed while the vehicle is stopped is the pattern 3 illustrated in FIG. 6. As described above, the pattern 3 is a pattern, in which automatic engine stop is prohibited (NO in Q3) at the point of time when the vehicle is stopped, and the prohibited state is continued until the vehicle starts (i.e. until the determination in Q12 becomes NO).

When the determination in Q22 is NO, and it is confirmed that the operation pattern is the pattern 3, in Q25, only the map data in FIG. 2 is updated, and the cause of prohibiting automatic engine stop is stored.

After one of the processes in Q23 to Q25 is carried out, in Q26, the cause stored in the storage unit U3 is displayed on the display 3. The display process is automatically carried out, each time automatic engine stop is prohibited, or each time automatic engine restart is performed. Specifically, when automatic engine stop is prohibited, a cause item corresponding to the cause of prohibiting automatic engine stop (i.e. one of the items along the horizontal axis in FIG. 2) is displayed on the display 3. When automatic engine restart is performed, a cause item corresponding to the cause of performing automatic engine restart (i.e. one of the items along the horizontal axis in FIG. 3) is displayed on the display 3. Allowing the driver to view the indication on the display 3 makes it possible for the driver to promptly recognize the information relating to automatic engine stop. The display process in Q26 may be carried out in response to an operation of a display request switch provided on the instrument panel or on the steering wheel.

After Q26, in Q27, it is determined whether the data monitor 4 is connected to the storage unit U3 of the controller U from the outside. When the determination in Q27 is YES, the storage contents stored in the storage unit U3 are output to the data monitor 4 and displayed in a predetermined format. An example of the data monitor 4 is a so-called drive recorder (ODR). In this case, the data monitor 4 includes a storage unit which stores input data. It is possible to modify the display format of storage contents in accordance with an operator's operation with respect to the data monitor 4.

In displaying the storage contents, one or more cause items selected according to predetermined criteria may be displayed from among the cause items recorded in the map illustrated in FIG. 2 or in the map illustrated in FIG. 3. In this case, it is desirable to prioritize display of a cause item that is highly likely to be associated with prohibiting automatic engine stop or performing automatic engine restart, taking into consideration that there is a limit in the display area. For instance, it is possible to prioritize display of a cause item having a larger number of times of serving as a cause of prohibiting automatic engine stop or as a cause of performing automatic engine restart (i.e. cause items to be displayed are preferentially selected in descending order of the number of serving times), or it is possible to prioritize display of a cause item having a shorter automatic stop execution time (i.e. cause items to be displayed are preferentially selected in ascending order of the automatic stop execution time). Further, it is possible to manually select prioritizing display of a cause item having a larger number of serving times, or prioritizing display of a cause item having a shorter automatic stop execution time, as necessary. The display pattern is not limited to the above example. For instance, it is possible to prioritize display of a cause item that newly serves as a cause of prohibiting automatic engine stop or as a cause of performing automatic engine restart.

In the foregoing, a preferred embodiment of the invention has been described. The invention, however, is not limited to the exemplified embodiment, but may be modified as necessary, as far as such modification lies within the scope of the invention as defined in the claims. For instance, the display device for displaying the storage contents in a storage unit may be only a display mounted on an instrument panel, or may be only a data monitor to be externally connected.

Further, an object of the present invention is not limited to an explicitly described one, but implicitly includes providing any technical matter expressed as a preferred feature or as an advantageous feature.

Summary of Embodiment

Lastly, features of the automatic stop device disclosed in the above embodiment and advantages of the automatic stop device will be summarized below.

An automatic stop device for a vehicle engine according to the embodiment includes an automatic stop control unit which performs automatic engine stop when a predetermined automatic stop initiating condition is established while a vehicle is stopped, and prohibits automatic engine stop when the automatic stop initiating condition is not established; a restart control unit which performs automatic engine restart when a predetermined automatic stop cancelling condition is established after the engine is automatically stopped; and a storage unit which stores a cause of prohibiting automatic engine stop when automatic stop of the engine is prohibited while the vehicle is stopped, or a cause of performing automatic engine restart when the engine that has been automatically stopped is automatically restarted.

According to the above configuration, the storage unit stores a cause of prohibiting automatic engine stop or a cause of performing automatic engine restart. This allows the driver to confirm the storage contents stored in the storage unit and makes it possible for the driver to clearly recognize the cause of prohibiting automatic engine stop or the cause of performing automatic engine restart. This is advantageous in keeping the driver from worrying about the automatic stop device. Further, allowing the driver to confirm the storage contents in the storage unit makes it possible for the driver to learn the way to enhance the fuel consumption by extending the time duration of automatic engine stop (i.e. the automatic stop execution time). Concerning a maintenance engineer of the vehicle, the maintenance engineer can give an appropriate advice to the driver by confirming the storage contents in the storage unit, when the maintenance engineer is informed of the driver's anxiety such that automatic engine stop is frequently prohibited or the engine is automatically restarted immediately after the engine is automatically stopped. Further, the storage contents help the maintenance engineer in early detection of anomaly or trouble of the automatic stop device or various kinds of sensors associated with the automatic stop device.

In the automatic stop device, preferably, the storage unit may store a plurality of cause items obtained by classifying the cause of prohibiting automatic engine stop or the cause of performing automatic engine restart according to the type of cause, and data representing a degree of influence of each of the cause items on prohibiting automatic engine stop or on performing automatic engine restart.

According to the above configuration, it is possible to appropriately grasp, among the plurality of cause items, what is an important cause item as the cause of prohibiting automatic engine stop or as the cause of performing automatic engine restart.

In the above configuration, more preferably, the storage unit may store, as the data representing a degree of influence of each of the cause items, the number of serving times which is the number of times when each of the cause items serves as the cause of prohibiting automatic engine stop or as the cause of performing automatic engine restart for each of the cause items.

According to the above configuration, it is possible to specify, among the plurality of cause items, a cause item serving as the cause of frequently prohibiting automatic engine stop or as the cause of frequently performing automatic engine restart.

The storage unit may store, as the data representing a degree of influence of each of the cause items, an automatic stop execution time representing a period of time during which the engine is automatically stopped for each of the cause items.

According to the above configuration, it is possible to specify, among the plurality of cause items, a cause item serving as the cause of shortening the automatic stop execution time.

Preferably, when two or more of the cause items serves as the cause of prohibiting automatic engine stop or as the cause of performing automatic engine restart, the storage unit may store data representing degrees of influence of all the relevant cause items.

According to the above configuration, it is possible to securely store all the causes of prohibiting automatic engine stop or all the causes of performing automatic engine restart, even if the plurality of cause items serves as the cause.

The cause items may include a driver request based on a driver's operation.

According to the above configuration, when automatic engine stop is prohibited or automatic engine restart is performed resulting from a driver's operation, the driver is informed of this matter. Thus, the driver can learn the way to drive the vehicle in order to enhance the fuel consumption by extending the time duration of automatic engine stop (i.e. an automatic stop execution time).

In the automatic stop device, preferably, storage contents of the storage unit may be allowed to be displayed on a display device.

According to the above configuration, the driver or the maintenance engineer of the vehicle can securely recognize the storage contents in the storage unit via the display device.

The display device may be a data monitor to be connected to the storage unit from an outside.

According to the above configuration, the maintenance engineer of the vehicle can give an appropriate advice to the driver for fuel consumption enhancement, or can detect anomaly or trouble of the vehicle at an early stage by checking the indication on the data monitor.

The display device may be an interior display mounted in advance on an instrument panel.

According to the above configuration, the driver can accurately learn the way for fuel consumption enhancement by checking the indication on the interior display.

When the storage unit stores a plurality of cause items obtained by classifying the cause of prohibiting automatic engine stop or the cause of performing automatic engine restart according to the type of cause, and data representing a degree of influence of each of the cause items on prohibiting automatic engine stop or on performing automatic engine restart, preferably, the display device may display one or more items selected from among the cause items stored in the storage unit, and the cause item to be selected as an item to be displayed on the display device may be changed in accordance with the data representing a degree of influence of each of the cause items.

The above configuration is advantageous in selecting a cause item having a high degree of necessity for display.

In the above configuration, more preferably, the storage unit may store, as the data representing a degree of influence of each of the cause items, the number of serving times which is the number of times when each of the cause items serves as the cause of prohibiting automatic engine stop or as the cause of performing automatic engine restart for each of the cause items, and the display device may prioritize display of a cause item having a larger number of serving times.

The above configuration is advantageous in promptly recognizing the cause of high frequency of prohibiting automatic engine stop or the cause of high frequency of performing automatic engine restart.

The storage unit may store, as the data representing a degree of influence of each of the cause items, an automatic stop execution time representing a period of time during which the engine is automatically stopped for each of the cause items, and the display device may prioritize display of a cause item having a shorter automatic stop execution time, or the display device may prioritize display of the storage contents in ascending order of the automatic stop execution time.

The above configuration is advantageous in promptly recognizing the cause of shortening the automatic stop execution time.

INDUSTRIAL APPLICABILITY

The invention is appropriately applicable to a vehicle which performs idle stop.

The invention claimed is:

1. An automatic stop device for a vehicle engine, comprising:
   an automatic stop control unit which performs automatic engine stop when a predetermined automatic stop initiating condition is established while a vehicle is stopped, and prohibits automatic engine stop when the automatic stop initiating condition is not established;
   a restart control unit which performs automatic engine restart when a predetermined automatic stop cancelling condition is established after the engine is automatically stopped; and
   a storage unit which stores a cause of prohibiting automatic engine stop when automatic stop of the engine is prohibited while the vehicle is stopped, or a cause of performing automatic engine restart when the engine that has been automatically stopped is automatically restarted, wherein
   the storage unit stores a plurality of cause items obtained by classifying the cause of prohibiting automatic engine stop or the cause of performing automatic engine restart according to a same type of cause, and the number of serving times which is the number of times when each of the cause items serves as the cause of prohibiting automatic engine stop or as the cause of performing automatic engine restart,
   the storage unit includes a plurality of memory blocks, in which the number of serving times of each of the cause items is stored, the memory blocks being provided for each of predetermined time ranges representing an automatic stop execution time, the automatic stop execution time being a period of time during which the engine is automatically stopped, and
   when the automatic stop of the engine is prohibited or when the engine is automatically restarted, the count number in a specific memory block where the cause item to which the cause of prohibiting automatic engine stop or the cause of performing automatic engine restart belongs, and the time range to which a measured automatic stop execution time of the engine belongs intersect is increased so as to store the number of serving times of each of the cause items for each of the automatic stop execution times.

2. The automatic stop device for a vehicle engine according to claim 1, wherein
   when two or more of the cause items serves as the cause of prohibiting automatic engine stop or as the cause of performing automatic engine restart, the storage unit increases the count numbers in the memory blocks corresponding to the cause items.

3. The automatic stop device for a vehicle engine according to claim 1, wherein
   the cause items include a driver request based on a driver's operation.

4. The automatic stop device for a vehicle engine according to any one of claim 1, wherein storage contents of the storage unit are allowed to be displayed on a display device.

5. The automatic stop device for a vehicle engine according to claim 4, wherein
the display device is a data monitor to be connected to the storage unit from an outside.

6. The automatic stop device for a vehicle engine according to claim 4, wherein
the display device is an interior display mounted in advance on an instrument panel.

7. The automatic stop device for a vehicle engine according to claim 4, wherein
the display device displays one or more items selected from among the cause items stored in the storage unit, and
the cause items to be displayed on the display device are preferentially selected in descending order of the number of serving times, the number of serving times of the cause item being obtained by summing the count numbers in the memory blocks whose corresponding cause items are identical to each other.

8. The automatic stop device for a vehicle engine according to claim 4, wherein
the display device displays one or more items selected from among the cause items stored in the storage unit, and
the cause items to be displayed on the display device are preferentially selected in ascending order of an average value of automatic stop execution times, the average value of automatic stop execution times being obtained based on the count numbers in the memory blocks whose corresponding cause items are identical to each other, and the automatic stop execution time in each of the memory blocks.

9. The automatic stop device for a vehicle engine according to claim 1, wherein
when the automatic stop of the engine is prohibited because the automatic stop initiating condition is not established at a point of time when the vehicle is stopped, and thereafter, the engine is automatically stopped because the automatic stop initiating condition is established, and thereafter, the engine is automatically restarted because the automatic stop cancelling condition is established, the storage unit carries out a process of storing the cause of prohibiting automatic engine stop and the cause of performing automatic engine restart at a point of time after an elapse of a predetermined time from a point of time when the automatic engine restart is initiated.

* * * * *